(12) United States Patent
Miyamoto et al.

(10) Patent No.: US 7,538,456 B2
(45) Date of Patent: May 26, 2009

(54) MOVING MAGNET TYPE LINEAR ACTUATOR

(75) Inventors: Yasuhiro Miyamoto, Fukuoka (JP);
Takahisa Yamada, Fukuoka (JP);
Tatsuhiko Koba, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 215 days.

(21) Appl. No.: 10/562,972

(22) PCT Filed: Jul. 8, 2004

(86) PCT No.: PCT/JP2004/009723
§ 371 (c)(1),
(2), (4) Date: Dec. 29, 2005

(87) PCT Pub. No.: WO2005/008867
PCT Pub. Date: Jan. 27, 2005

(65) Prior Publication Data
US 2007/0114854 A1    May 24, 2007

(30) Foreign Application Priority Data
Jul. 16, 2003    (JP)    ............................. 2003-275208

(51) Int. Cl.
*H02K 41/02*    (2006.01)
(52) U.S. Cl. ............................... 310/12; 310/16; 310/17
(58) Field of Classification Search .................. 310/12, 310/15–17
See application file for complete search history.

(56) References Cited
U.S. PATENT DOCUMENTS
5,416,396 A * 5/1995 Takei .......................... 318/653

6,037,680 A * 3/2000 Korenaga et al. ............. 310/12

(Continued)

FOREIGN PATENT DOCUMENTS

JP    5-346120 A    12/1993

(Continued)

OTHER PUBLICATIONS

JPO Website Machine Translation of JP 2000-116105, par.49-50 & 103-115, Apr. 2000. http://www.jpo.go.jp/.*

*Primary Examiner*—Burton Mullins
(74) *Attorney, Agent, or Firm*—Sughrue Mion, PLLC

(57) ABSTRACT

In a moving magnet type linear actuator (10), a stator (30) having an armature (32) including a magnetic iron core (33) fixed on a stator base (31) and an armature winding (34) wound around the magnetic iron core (33); and a movable body (20) having a field permanent magnet (21) arranged oppositely to the magnetic iron core (33) through a magnetic gap and a magnetic holder (22) supporting the field permanent magnet (21) and movably arranged on the stator base (31), the magnetic holder (22) is made of a non-magnetic substance, and a magnetic back yoke (39) is arranged on the side opposite to the armature with respect to the field permanent magnet (22) to from a gap between the magnetic back yoke (39) and the field permanent magnet (21) and is fixed to supporters provided on the stator base (31). In accordance with this configuration, there is provided a moving magnet type linear actuator which can reduce the weight of the movable body to improve the accelerating performance and gives no problem about the life of linear guides.

7 Claims, 3 Drawing Sheets

U.S. PATENT DOCUMENTS

| | | | |
|---|---|---|---|
| 6,528,907 B2 * | 3/2003 | Hwang et al. | 310/12 |
| 7,345,384 B2 * | 3/2008 | Yoshida et al. | 310/12 |
| 7,368,837 B2 * | 5/2008 | Miyamoto et al. | 310/12 |
| 7,456,526 B2 * | 11/2008 | Teramachi et al. | 310/12 |
| 2001/0048249 A1 * | 12/2001 | Tsuboi et al. | 310/12 |
| 2007/0278863 A1 * | 12/2007 | Yamamoto et al. | 310/12 |

FOREIGN PATENT DOCUMENTS

| | | |
|---|---|---|
| JP | 6-254737 A | 9/1994 |
| JP | 7-75325 A | 3/1995 |
| JP | 10-12539 A | 1/1998 |
| JP | 2000-116105 A | 4/2000 |
| JP | 2000-262037 A | 9/2000 |
| JP | 2000-308328 A | 11/2000 |
| JP | 2000-312464 A | 11/2000 |

* cited by examiner

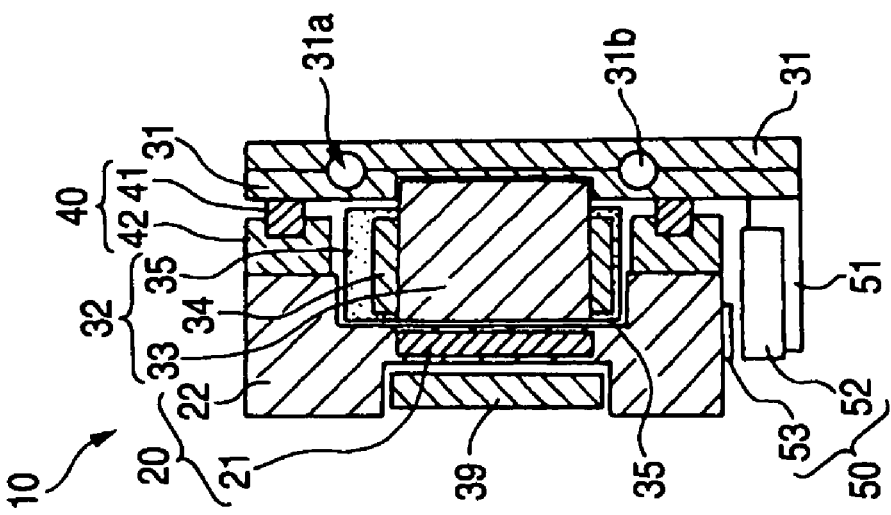
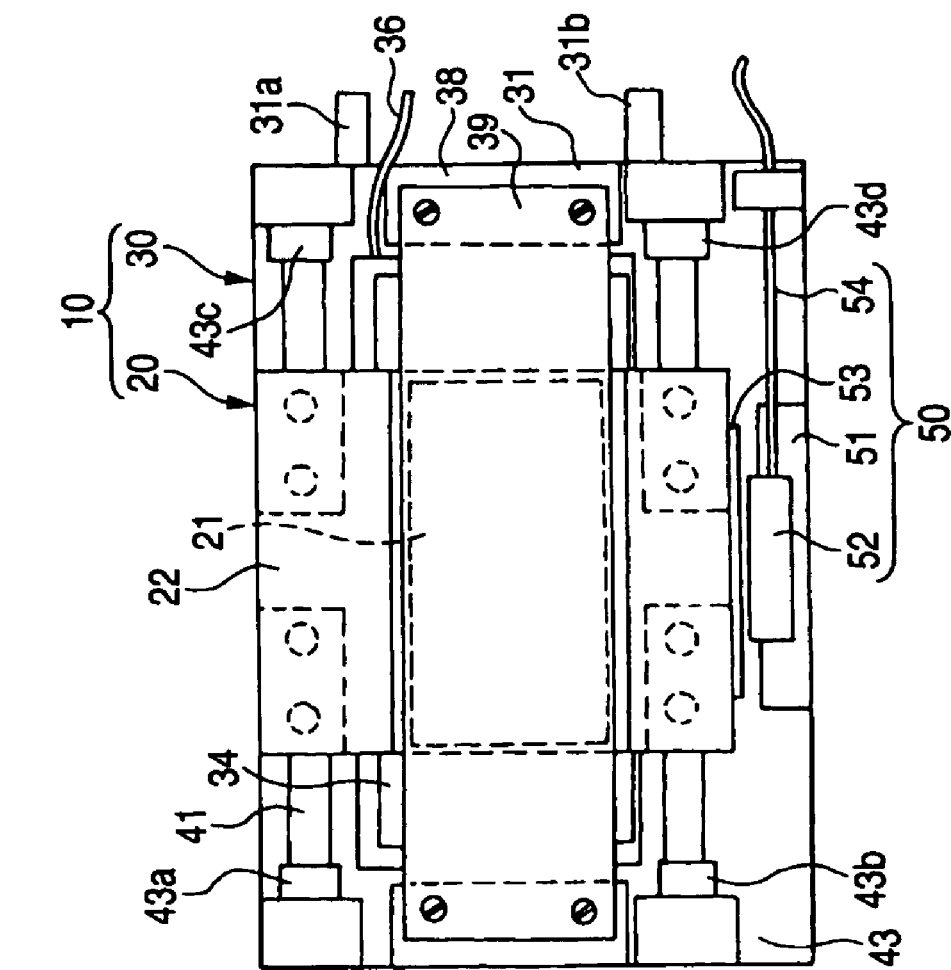

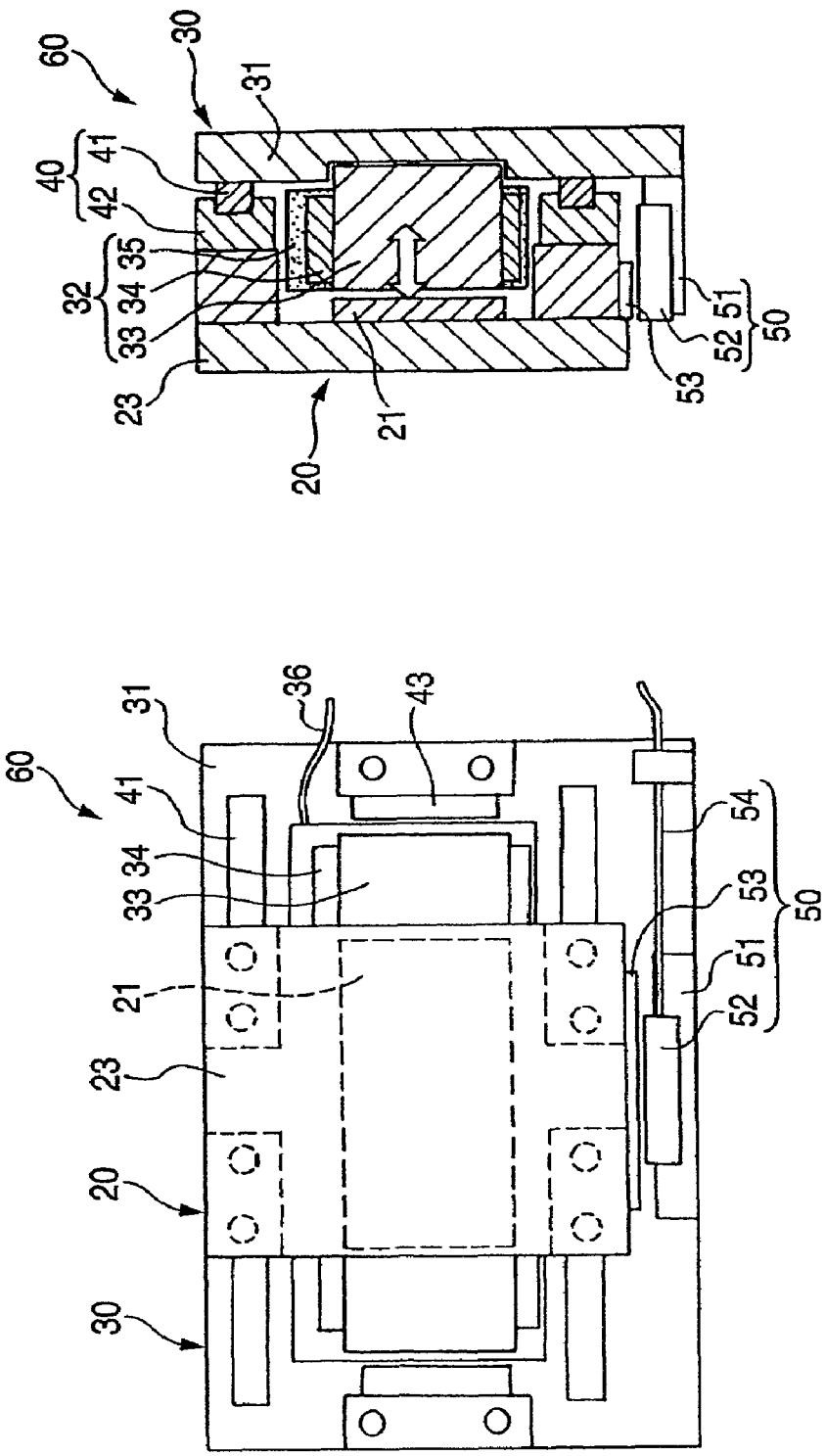

MOVING MAGNET TYPE LINEAR ACTUATOR

TECHNICAL FIELD

This invention relates to a moving magnet type linear actuator with a field magnet on a moving side, and more particularly to a magnetic circuit structure for weight-reducing a movable body.

BACKGROUND ART

There is a previously known moving coil type actuator having a structure in which an armature is opposite to a field permanent magnet through a magnetic gap (For example, see Patent Reference 1).

Patent Reference 1: JP-A-2000-308328

The invention disclosed in Patent Reference 1 relates to a moving coil type linear actuator filed by the same inventors as those of this application. The invention is accomplished for facilitating connection processing of a connecting wire and a neutral point of an armature coil and for providing a linear motor capable of increasing the thrust per a unit volume of a core block.

The linear motor is provided with an armature opposite to a field permanent magnet through a magnetic gap. The armature has an armature core divided into a plurality of core blocks in a thrust direction and an armature coil. The armature coil wound around each core block is taken out by unlacing the winding ending portion of a coil conductor onto the winging starting portion by ½ turn so that they are arranged oppositely on both sides of the core block. A wiring substrate having a wiring pattern for connecting the connecting wire and neutral point of the armature coil is provided on both sides of a yoke of the armature core.

Such a configuration could facilitate the connection processing of the connecting wire and neutral point of the armature coil and increase the thrust per unit volume of the core block.

However, power could not be easily supplied to the armature which moves. In order to obviate such an inconvenience, the linear actuator of not a moving coil type but a moving magnet type is developed.

FIG. 3 is a view showing a moving magnet type linear actuator which is a prior art of this invention; (a) is a plan view and (b) is a sectional side view.

In FIG. 3, reference numeral 60 generally denotes a moving magnet type linear actuator which mainly includes a movable body 20, a stator 30, a linear guide 40 and a position detecting portion 50.

The movable body 20 is mainly constructed of a field permanent magnet 21 and a magnetic yoke 23 which holds it. The stator 30 is mainly constructed of a stator base 31 and an armature 32 fixed thereon. The armature 32 includes a magnetic iron core 33, an armature winding 34 wound around the core, an insulating layer 35 encircling the armature winding 34 and a power supplying wire 36 which serves to supply power to the armature winding 34.

The linear guide 40 (FIG. 3(b)) is mainly constructed of linear guide rails 41, liner guide blocks 42 running thereon, and stopper mechanisms 43 (FIG. 3(a)) for forcibly stopping the running of the linear guide block 42 at both ends in the running direction of the linear actuator 60.

The position detecting portion 50 is mainly constructed of a detecting portion supporter 51 fixed on the stator base 31, a linear scale detecting portion 52 fixed on the detecting supporter 51 and a linear scale 53 fixed on the side of the movable body adjacently apart from the linear scale detecting portion 52, and a signal line 54.

As understood from the above description, the magnetic yoke 23 is provided behind the field permanent magnet 21, and both constitute the moving body serving as a magnetic circuit.

The armature 32 has the magnetic iron core, and the armature winding 34 is wound on the slots made at an equal pitch in the magnetic iron core. When a current is passed through the armature winding 34, the linear actuator 60 moves within a stroke which a difference between the lengths of the armature and field movable body.

DISCLOSURE OF THE INVENTION

Problems that the Invention is to Solve

Meanwhile, the prior art has a problem that the field magnetic yoke 23 having a greater specific gravity is required on the side of the movable body 20 so that the accelerating performance of the movable body 20 could not be increased.

Further, the prior art has also a problem that a pulling force four-times or more as great as the maximum thrust acts between the movable body 20 and the armature core (iron core). 33 so that an accelerating/decelerating operation at a high frequency may attenuate the life of the linear guide.

This invention is accomplished in order to solve these problems. An object of this invention is to provide a moving magnet type linear actuator which can sufficiently increase the accelerating performance of a movable body and does not attenuate the life of a linear guide even when the accelerating/decelerating operation at a high frequency is performed.

Means for Solving the Problems

In order to solve the above problem, the invention provides a moving magnet type linear actuator including: a stator having a stator base and an armature including a magnetic iron core fixed on the stator base and an armature winding wound around the magnetic iron core; and a movable body having a field permanent magnet arranged oppositely to the magnetic iron core through a magnetic gap and a magnetic holder supporting the field permanent magnet and movably arranged on the stator base, wherein the magnetic holder is made of a non-magnetic substance, a magnetic back yoke is arranged on the side opposite to the armature with respect to the field permanent magnet, a width thereof being approximately equal to a width of the field permanent magnet, a length thereof being not smaller than the stroke of the movable body, and both ends thereof in the longitudinal direction being fixed to the stator, and a gap is formed between the magnetic back yoke and the field permanent magnet.

In a specific enhancement a scale segment of a linear scale is fixed to the magnetic holder, and a detecting segment of the linear scale is fixed to the stator base with a gap from the scale segment.

In a more specific enhancement two linear guides are arranged in parallel so as to sandwich both sides of the armature, guide blocks are arranged on each of the linear guides, and the magnetic holder is fixed on the guide blocks.

In another enhancement, a slot having a width corresponding to the widthwise space between the guide blocks is machined in the non-magnetic holder, and the field magnet is fixed in the slot.

In another specific enhancement a stopper mechanism is provided at each of four ends of the two linear guides in parallel.

In yet another enhancement guide pipes for forcible cooling refrigerant are embedded in the stator base.

In another specific enhancement, the magnetic back yoke is a laminate of thin electromagnetic steel plates.

ADVANTAGE OF THE INVENTION

In accordance with the invention of a moving magnet type linear actuator, the magnetic holder is made of a non-magnetic substance, and a magnetic back yoke is fixed to the stator. For this reason, the weight of the movable body can be reduced, thereby realizing the maximum acceleration/deceleration.

In a specific enhancement, a scale segment of a linear scale is fixed to the magnetic holder, and a detecting segment of the linear scale is fixed to the stator base with a gap from the scale segment. In this configuration, since the magnetic holder is made of the non-magnetic substance, a position detecting portion is difficult to be susceptible to the influence of magnetic lines of force.

In another specific enhancement, two linear guides are arranged in parallel so as to sandwich both sides of the armature, guide blocks are arranged on each of the linear guides, and the magnetic holder is fixed on the guide blocks. For this reason, the linear guide rails and guide blocks can be made of the material with lower strength.

In yet another specific enhancement, a slot having a width corresponding to the widthwise space between the guide blocks is machined in the non-magnetic holder, and the field magnet is fixed in the slot. For this reason, the height of the linear actuator can be lowered.

In still another specific enhancement, a stopper mechanism is provided at each of four ends of the two linear guides in parallel. For this reason, the capability of the stopper mechanism may be relatively low. In addition, the stopper mechanisms are provided at not two points in the prior art but at four points, the capability of a single stopper mechanism may be further low.

In another specific enhancement, guide pipes for forcible cooling refrigerant are embedded in the stator base. In this configuration, a forcible cooling structure can be realized in which the heat generating area collected at a single position on the side of the stator is cooled by liquid, thereby permitting the cooling performance to be improved.

In another enhancement, the actuator is characterized in that the magnetic back yoke is a laminate of thin electromagnetic steel plates. For this reason, eddy current loss due to crossing of field magnetic fluxes can be reduced, thereby enhancing the iron loss reducing effect during the high speed.

BRIEF DESCRIPTION OF THE DRAWINGS

[FIG. 1]

FIG. 1(a)-FIG. 1(b) shows a moving magnet type linear actuator according to this invention; (a) is a plan view thereof and (b) is a side sectional view thereof.

FIG. 2 is a perspective view of the main part of the linear actuator shown in FIG. 1.

[FIG. 3]

FIG. 3(a)-FIG. 3(b) shows a moving magnet type linear actuator according to a prior art; (a) is a plan view thereof and (b) is a side sectional view thereof.

Figure 2:
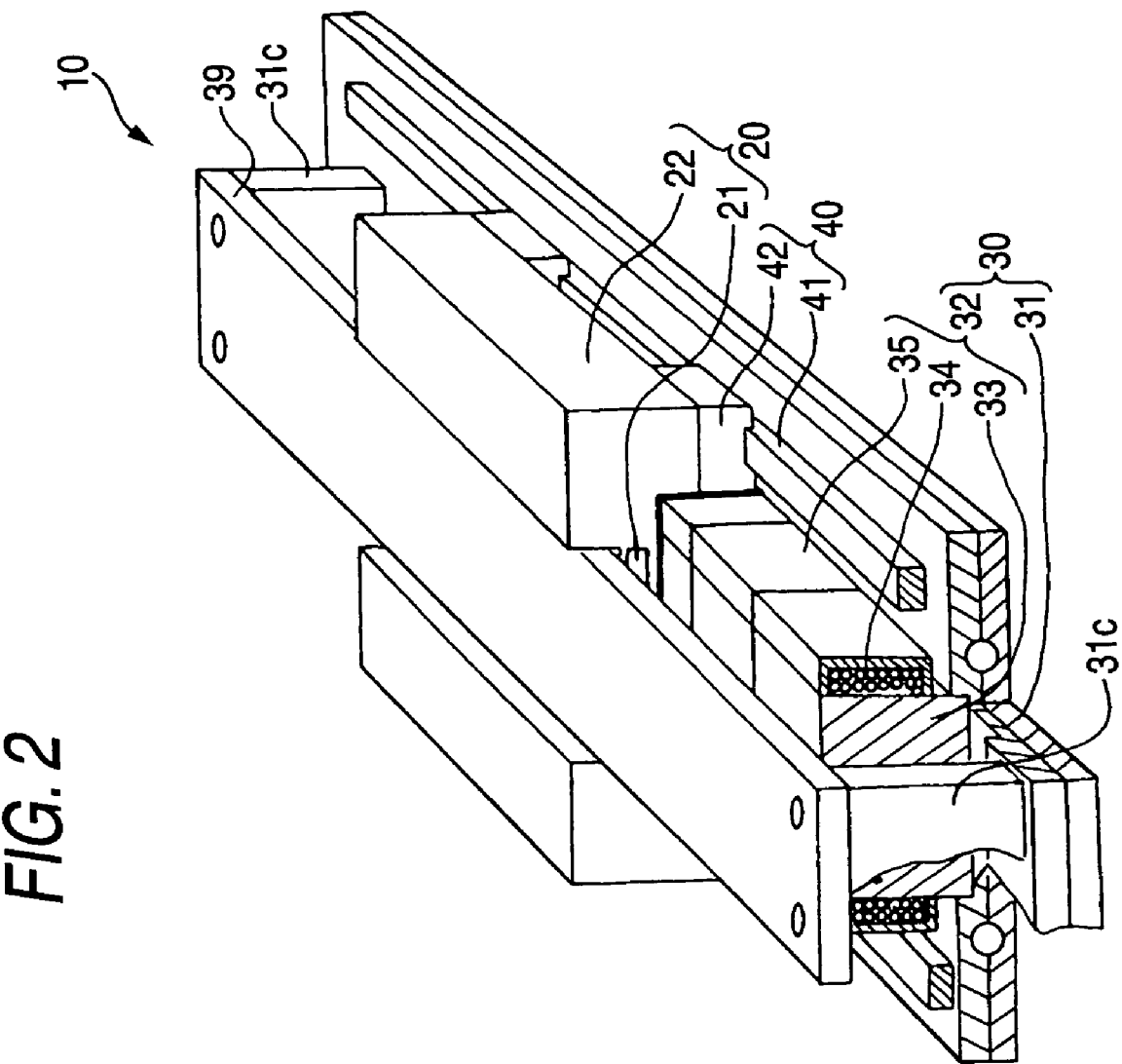
[FIG. 2]

DESCRIPTION OF REFERENCE NUMERALS AND SIGNS 10 a linear actuator
20 a movable body
21 a field permanent magnet
22 a non-magnetic magnet holder
30 a stator
31 a stator base
31a, b a guide pipe for forcible cooling refrigerant
31c a supporter
32 an armature
33 a magnetic iron core
34 an armature winding
35 an insulating layer
36 a power supplying wire
39 a magnetic back yoke
40 a linear guide
41 a linear guide rail
42 a linear guide block
43 a stopper mechanism
43a to 43d a shock absorber
50 a position detecting portion
51 a detecting portion supporter
52 a linear scale detecting portion
53 a liner scale
53 a signal line

MODE FOR CARRYING OUT THE INVENTION

Now referring to the drawings, an explanation will be given of a concrete embodiment of this invention.

Embodiment 1

FIG. 1 shows a moving magnet type linear actuator according to this invention; (a) is a plan view thereof and (b) is a side sectional view thereof. FIG. 2 is a perspective view of the main part of the linear actuator shown in FIG. 1.

In both figures, reference numeral 10 generally denotes a moving magnet type linear actuator which mainly includes a movable body 20, a stator 30, a linear guide 40 and a position detecting portion 50.

The movable body 20 is mainly constructed of a field permanent magnet 21 and a non-magnetic magnet holder 22 which holds it.

The stator 30 is mainly constructed of a stator base 31, an armature 32 fixed thereon and a magnetic back yoke 39 provided according to this invention. The armature 32 includes a magnetic iron core 33, an armature winding 34 wound around the magnetic iron core 33, an insulating layer 35 encircling the armature winding 34 and a power supplying wire 36 which serves to supply power to the armature winding 34.

In this way, this invention provides a moving magnet type linear motor in which on the moving side, the number of field magnetic poles is smaller than the magnetic poles of magnetomotive force generated in the armature 32 so that the difference therebetween serves as a stroke of a linear actuator.

An explanation will be given of the construction of each component.

First, the construction of the movable body 20 will be explained. The field permanent 21 is arranged oppositely to the magnetic iron core 33 on the side of the stator 30 through a magnetic gap. The size of the field permanent magnet 21 has a width equal to that of the magnetic iron core 33 and a length in a running direction of the movable body 20. The field permanent magnet 21 has magnetic poles embedded in the plate-like non-magnetic holder 22, like N-pole, S-pole, over the length of the movable body 20. The non-magnetic magnet holder 22 may be made of aluminum which is light, which holds the field permanent magnet 21 with the gap from the magnetic iron core 33. The magnet holder 22 is fixed on linear guide blocks 42 provided back and forth in a running direction of two parallel linear guide rails 41. The area of the magnet holder 22 where the field permanent magnet 21 is supported is made as possible as thin so that the magnetic back yoke 39 can be fixedly arranged behind the movable body 20. This arrangement permits magnetic pulling force to be cancelled and a great gap magnetic flux density to be designed, thereby realizing high thrust and high acceleration/deceleration.

In this way, on the side of the movable body 20 having the field permanent magnet 21, the guide blocks 42 which form pairs with the linear guide rails 41 are fixed left and right. In the space between these guide blocks 42, the non-magnetic holder 22 is subjected to hole machining or punching machining with the same size of the field permanent magnet and field permanent magnet 21 is fixed.

Further, a scale 53 of the linear scale 50 is fixed on the side of the movable body 20 with a gap from the linear scale detecting portion 52 fixed to the stator base 31.

Next, the structure of the stator 30 will be explained.

On the stator base 30, a plurality of pieces of the magnetic iron core 33 which are square in section are extended along the central position in the running direction so that their S poles and N poles are alternately arranged. On the periphery of the pieces of the magnetic irons core 33, the armature winding 34 is wound. The outer periphery of the armature winding 34 is covered with the insulating layer 35. The power supply to the armature winding 34 is done through a flexible conductive wire 36 which can be moved by a maximum stoke of the movable body 20.

On the side opposite to the armature with respect to the field permanent magnet 21, the magnetic back yoke 39 is arranged oppositely to the field permanent magnet 21 through a gap. The magnetic back yoke 39 is extended in the running direction of the armature 32 so as to cover the armature 32 and field permanent magnet 21 and fixed to the supporters 31c provided on the stator base 31 in the front and rear spaces in the running direction. The width of the magnetic back yoke 39 is approximately equal to that of the field permanent magnet 21. The length thereof is not smaller than the stroke of the movable body 20.

Further, guide pipes 31a, 31b for forcible cooling refrigerant are formed in the stator base 31. These guide pipes 31a, 31b for forcible cooling refrigerant can be formed by bonding two plates each having a long groove which is semicircular in section to each other so that semicircles are face each other to form a circle. In this way, since the guide pipes 31a, 31b for forcible cooling refrigerant are embedded in the stator base 31, the effective thrust performance of the linear actuator 10 is improved and its temperature rise is avoided.

The linear guides 40 each is mainly constructed of a linear guide rail 41, the liner guide block 42 running thereon, and the stopper mechanism 43 for forcibly stopping the running of the linear guide block 42 at both ends in the running direction of the linear actuator 10.

In this way, the stopper mechanism 43 is arranged to have the shock absorbers 43a to 43a at four ends at the front, rear left and right positions in the two liner guide rails 41 in parallel and is served as an overrun preventing mechanism.

The position detecting portion 50 is mainly constructed of the detecting portion supporter 51 fixed on the stator base 31, the linear scale detecting portion 52 fixed on the detecting portion supporter 51, and the linear scale 53 fixed on the side of the movable body 20 adjacently apart from the linear scale detecting portion 52.

As a modification of this invention, the magnetic back yoke 39 may be a laminate of thin electromagnetic steel plates. In this case, finally, since the laminate of the thin electromagnetic plates is used as the magnetic back yoke, eddy current loss due to crossing of field magnetic fluxes can be reduced, thereby enhancing the iron loss reducing effect during the high speed.

As described above, in the moving magnet type linear actuator, since the magnet holder is made of the non-magnetic substance, the weight of the movable body can be reduced.

Further, since the magnetic back yoke is arranged on the side opposite to the armature with respect to the field permanent, the magnetic back yoke compensates for the construction of the magnet holder made of the non-magnetic substance for the purpose of weight reduction, thereby realizing high thrust and high acceleration/deceleration.

Further, the width of the magnetic back yoke 39 is approximately equal to that of the field permanent magnet 21, and the length thereof is not smaller than the stroke of the movable body 20. In addition, both ends of the back yoke 39 are fixed to the stator to form the spaces between itself and the field permanent magnet. Such a configuration permits the possible maximum thrust and the possible maximum acceleration/deceleration to be realized.

Further, the scale segment of the liner scale is fixed to the magnetic holder and the detecting portion of the liner scale is fixed to the stator base 31 with a gap from the scale segment, and the magnetic holder is made of the non-magnetic substance. For this reason, the position detecting portion is difficult to be susceptible to the influence of magnetic lines of force. Further, this invention is characterized in that the magnetic holder is fixed to the guide blocks arranged on each of the linear guide rails.

Further, the two guide rails are arranged in parallel in the longitudinal direction of the armature so as to sandwich both sides of the armature. The guide blocks are arranged on each of the linear guide rails, respectively. And the magnetic holder is fixed to the guide blocks. Thus, the liner guide rails and guide blocks can be made of the material with small strength.

Further, the slot having a width corresponding to the widthwise space between the guide blocks is machined in the non-magnetic holder. And the field magnet is fixed in the slot. For this reason, the height of the linear actuator can be lowered.

Further, since the stopper mechanisms are provided at four ends of the two parallel linear guide rails, the capability of the stopper mechanism may be relatively low. In addition, the stopper mechanisms are provided at not two points in the prior art but at four points, the capability of a single stopper mechanism may be further low.

Further, since the guide pipes for forcible cooling refrigerant are embedded in the stator base 31, the armature serving as a heat generating body is located on the side of the stator. For this reason, a forcible cooling structure can be realized in which the heat generating area collected at a single position on the side of the stator is cooled by liquid, thereby permitting the cooling performance to be improved.

INDUSTRIAL APPLICABILITY

In accordance with this invention, the moving magnet type linear actuator in which the filed magnet is located on a moving side is efficiently used as a magnetic circuit structure for reducing the weight of a movable body.

The invention claimed is:

1. A moving magnet type linear actuator comprising:
a stator having a stator base and an armature including a magnetic iron core fixed on the stator base and an armature winding wound around the magnetic iron core; and
a movable body having a field permanent magnet arranged oppositely to the magnetic iron core through a magnet gap and a magnetic holder supporting the field permanent magnet and movably arranged on the stator base, wherein
the magnet holder is made of a non-magnetic substance,
a magnetic back yoke is arranged on the side opposite to the armature with respect to the field permanent magnet, a width thereof being approximately equal to a width of the field permanent magnet, a length thereof being not smaller than the stroke of the movable body, and both ends thereof in the longitudinal direction being fixed to the stator, the field permanent magnet being positioned only on one side of the magnetic back yoke, the field permanent magnet being positioned only on one side of the armature winding, and
a gap is formed between the magnetic yoke and the field permanent magnet.

2. The moving magnet type linear actuator according to claim 1, wherein
a scale segment of a linear scale is fixed to the magnet holder, and
a detecting segment of the linear scale is fixed to the stator base with a gap from the scale segment.

3. The moving magnet type linear actuator according to claim 1, wherein
two linear guides are arranged in parallel so as to sandwich both sides of the armature,
guide blocks are arranged on each of the linear guides, and
the magnet holder is fixed on the guide blocks.

4. The moving magnet type linear actuator according to claim 3, wherein
a slot having a width corresponding to the widthwise space between the guide blocks is machined in the magnet holder, and
the field magnet is fixed in the slot.

5. The moving magnet type linear actuator according to claim 3, wherein
a stopper mechanism is provide at each of four ends of the two linear guides in parallel.

6. The moving magnet type linear actuator according to claim 1, wherein
guide pipes for forcible cooling refrigerant are embedded in the stator base.

7. The moving magnet type linear actuator according to claim 1, wherein
the magnetic back yoke is a laminate of thin electromagnetic steel plates.

* * * * *